United States Patent
Harada et al.

(10) Patent No.: US 9,610,926 B2
(45) Date of Patent: Apr. 4, 2017

(54) VEHICLE BRAKE HYDRAULIC PRESSURE CONTROL APPARATUS

(71) Applicant: NISSIN KOGYO CO., LTD., Ueda, Nagano (JP)

(72) Inventors: Yutaka Harada, Nagano (JP); Manabu Hiroya, Nagano (JP)

(73) Assignee: AUTOLIV NISSIN BRAKE SYSTEMS JAPAN CO., LTD., Nagano (JP)

( * ) Notice: Subject to any disclaimer, the term of this patent is extended or adjusted under 35 U.S.C. 154(b) by 67 days.

(21) Appl. No.: 14/080,413

(22) Filed: Nov. 14, 2013

(65) Prior Publication Data

US 2014/0142825 A1     May 22, 2014

(30) Foreign Application Priority Data

Nov. 16, 2012  (JP) .................................. 2012-252023

(51) Int. Cl.
   B60T 8/17     (2006.01)
   B60T 7/12     (2006.01)
   (Continued)

(52) U.S. Cl.
   CPC .............. B60T 8/17 (2013.01); B60T 7/122 (2013.01); B60T 13/146 (2013.01);
   (Continued)

(58) Field of Classification Search
   CPC .... B60T 13/146; B60T 13/662; B60T 13/686; B60T 8/17; B60T 7/122; B60W 30/18118
   (Continued)

(56) References Cited

U.S. PATENT DOCUMENTS

| 2007/0090692 A1* | 4/2007 | Kamikado et al. ........... 303/192 |
| 2007/0164608 A1* | 7/2007 | Streit et al. ................... 303/191 |
| 2013/0085649 A1* | 4/2013 | Matoy ................... B60T 8/1708 701/70 |

FOREIGN PATENT DOCUMENTS

| CN | 102548813 A | 7/2012 |
| JP | 2007112294 A | 5/2007 |
| JP | 2009274521 A | 11/2009 |

OTHER PUBLICATIONS

Japanese Office Action for Related JP Application No. 2012-252023, drafted Sep. 19, 2014, dated Sep. 24, 2014, 6 pages.
(Continued)

*Primary Examiner* — Nga X Nguyen
(74) *Attorney, Agent, or Firm* — Andrew M. Calderon; Roberts Mlotkowski Safran Cole & Calderon P.C.

(57) ABSTRACT

One embodiment provides a vehicle brake hydraulic pressure control apparatus configured to perform a vehicle hold control which controls a brake hydraulic pressure when a vehicle comes to a halt. The vehicle brake hydraulic pressure control apparatus includes: a behavior determination section configured to determine whether or not a behaving amount in a lateral direction of the vehicle is equal to or larger than a first threshold; and an operation determination section configured to determine whether or not a control member provided to control the vehicle is operated. Further, the vehicle hold control is canceled at least when the behavior determination section determines that the behaving amount is equal to or larger than the first threshold and the operation determination section determines that the control member is operated.

17 Claims, 8 Drawing Sheets

(51) Int. Cl.
  *B60W 30/18*    (2012.01)
  *B60T 13/14*    (2006.01)
  *B60T 13/66*    (2006.01)
  *B60T 13/68*    (2006.01)
  B60T 8/36       (2006.01)
  B60T 8/48       (2006.01)
(52) U.S. Cl.
  CPC .......... *B60T 13/662* (2013.01); *B60T 13/686* (2013.01); *B60W 30/18118* (2013.01); *B60T 8/3655* (2013.01); *B60T 8/4872* (2013.01); *B60T 2201/06* (2013.01)
(58) Field of Classification Search
  USPC ..................................................... 701/70, 78
  See application file for complete search history.

(56) References Cited

OTHER PUBLICATIONS

European Search Report dated Jan. 14, 2014, 7 pages.
Chinese Office Action for Related CN Application No. 2013105765096, dated Mar. 15, 2016, 14 pages.

\* cited by examiner

VEHICLE BRAKE HYDRAULIC PRESSURE CONTROL APPARATUS

CROSS-REFERENCE TO RELATED APPLICATION(S)

This application claims priority (priorities) from Japanese Patent Application No. 2012-252023 filed on Nov. 16, 2012, the entire contents of which are incorporated herein by reference.

FIELD

An aspect of the present invention relates to a vehicle brake hydraulic pressure control apparatus.

BACKGROUND

As a vehicle brake hydraulic pressure control apparatus which executes a vehicle hold control which controls a brake hydraulic pressure when a vehicle comes to a halt, for example, there is conventionally known a vehicle brake hydraulic pressure control apparatus in which a brake hydraulic pressure is reduced when a yaw rate is applied to a vehicle while a vehicle hold control is being executed (refer to JP-2006-528579-A). In this technique, when a vehicle which stays at a halt on a slope with a low-μ road surface such as an iced road or the like starts to slide down backwards while turning, the brake hydraulic pressure held is reduced. Therefore, the locking of wheels is canceled, whereby the driver can regain control.

However, in the event that a brake hydraulic pressure held is designed to be reduced based on a yaw rate applied to a vehicle during a vehicle hold control as done conventionally, for example, when a yaw rate is applied to a vehicle staying at a halt on a turntable equipped to a parking tower, a brake hydraulic pressure may be reduced although a driver of the vehicle has no intention to do so.

SUMMARY

One object of the invention is to provide a vehicle brake hydraulic pressure control apparatus which can suppress an unintended reduction of brake hydraulic pressure during a vehicle hold control.

An aspect of the present invention provides a vehicle brake hydraulic pressure control apparatus configured to perform a vehicle hold control which controls a brake hydraulic pressure when a vehicle comes to a halt, including:

a behavior determination section configured to determine whether or not a behaving amount in a lateral direction of the vehicle is equal to or larger than a first threshold; and an operation determination section configured to determine whether or not a control member provided to control the vehicle is operated, wherein the vehicle hold control is canceled at least when the behavior determination section determines that the behaving amount is equal to or larger than the first threshold and the operation determination section determines that the control member is operated.

According to the configuration described above, although the behaving amount becomes equal to or larger than the first threshold during the vehicle hold control, the vehicle hold control is not canceled unless the control member is operated. Therefore, even though a lateral behaving amount is produced in the vehicle, for example, when it stays at a halt on a turntable equipped to a parking tower, an unintended reduction of brake hydraulic pressure can be suppressed. On the other hand, when the vehicle which stays at a halt on a slope with a low-μ road surface such as an iced road or the like starts to slide down backwards while turning during the vehicle hold control, a lateral behaving amount will be produced in the vehicle, and the driver will operates the control member. Accordingly, the vehicle hold control is canceled and the brake hydraulic pressure held is reduced, thereby allowing the driver to regain control of the vehicle.

Another aspect of the present invention provides the vehicle brake hydraulic pressure control apparatus, wherein the operation determination section determines whether or not the control member is operated by determining whether or not an operation amount of the control member is equal to or larger than a second threshold.

According to this configuration, since the brake hydraulic pressure is not reduced by a slight operation amount (an operation amount which is smaller than the second threshold), an erroneous reduction of brake hydraulic pressure which is triggered by a slight movement of the control member which would be caused by an erroneous touch therewith by the driver while the vehicle is at a halt can be suppressed.

Still another aspect of the present invention provides the vehicle brake hydraulic pressure control apparatus, wherein the operation amount of the control member is a steering angle of a steering wheel which is outputted from a steering angle sensor.

According to this configuration, since the determination is made based on the operation amount (the steering angle) of the steering wheel in consideration of the fact that the driver will operate the steering angle in order to regain control of the vehicle, a reduction of brake hydraulic pressure can be preferably performed.

Still another aspect of the present invention provides the vehicle brake hydraulic pressure control apparatus, wherein the behaving amount is a yaw rate which is outputted from a yaw rate sensor.

According to this configuration, a side slip state (a skid state) of the vehicle can be appropriately determined based on the yaw rate.

Still another aspect of the present invention provides the vehicle brake hydraulic pressure control apparatus, wherein, when the behavior determination section determines that the behaving amount is equal to or larger than the first threshold before the vehicle hold control is started, the vehicle hold control is prohibited from being performed.

According to this configuration, when the behaving amount has already been equal to or larger than the first threshold before the vehicle hold control is started, that is, before the vehicle comes to a halt, the start of the vehicle hold control is prohibited. Therefore, when compared with, for example, a configuration in which the start of the vehicle hold control is not prohibited, the unnecessary execution of the vehicle hold control unnecessarily while the vehicle is behaving can be avoided.

According to the invention, the unintended reduction of brake hydraulic pressure driver during the vehicle hold control can be suppressed.

DETAILED DESCRIPTION

First Embodiment

Figure 1:
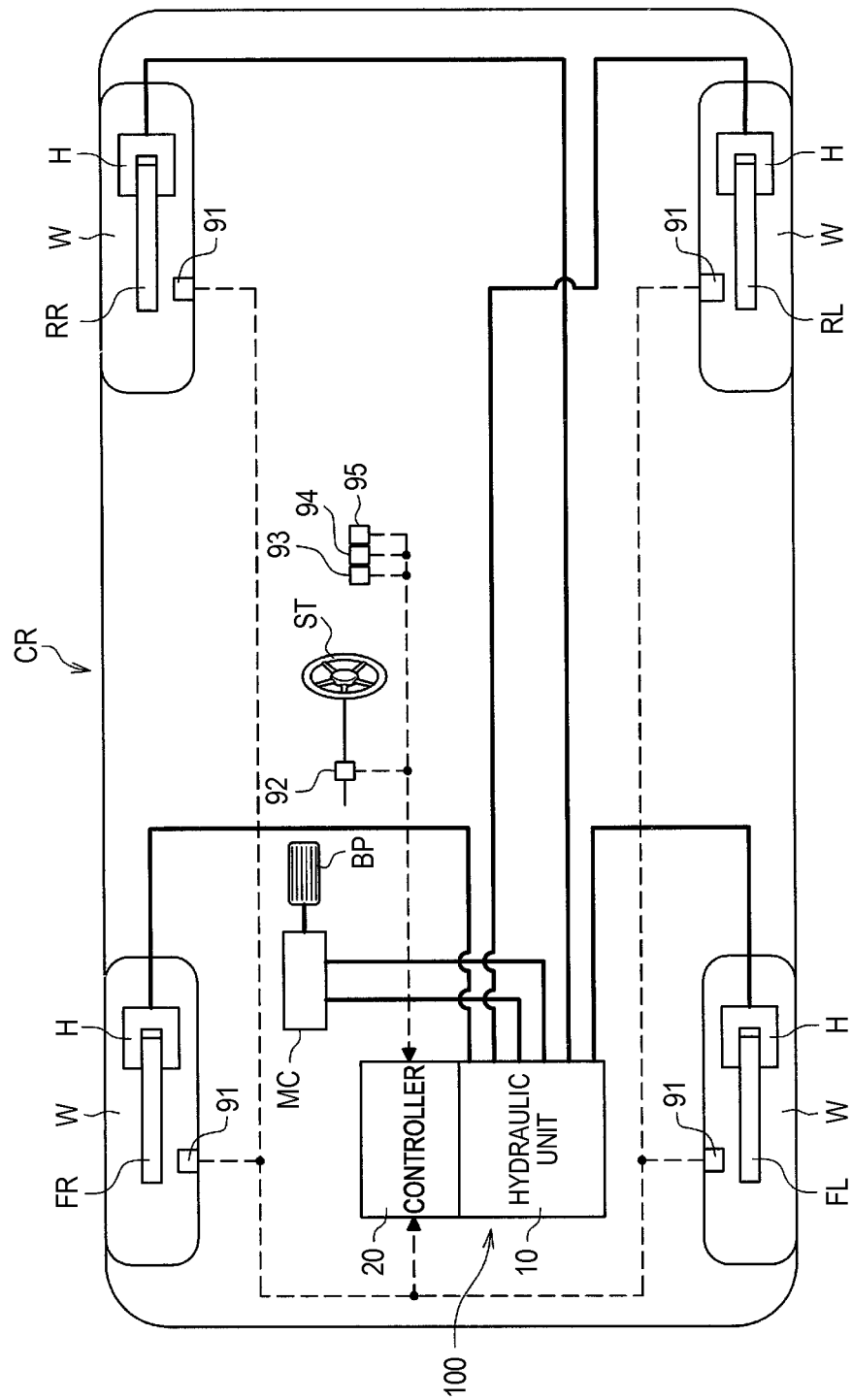
FIG. 1 is a block diagram of a vehicle which is equipped with a vehicle brake hydraulic pressure control apparatus according to a first embodiment of the invention.

Next, referring to the drawings as required, a first embodiment of the invention will be described in detail.

As shown in FIG. 1, a vehicle brake hydraulic pressure control apparatus 100 is designed to control a braking force (a brake hydraulic pressure) which is imparted to individual wheels W of a vehicle CR as required and includes mainly a hydraulic unit 10 in which fluid lines (hydraulic lines) and various types of constituent components are provided and a controller 20 which controls the various types of constituent components in the hydraulic unit 10 as required.

Connected to the controller 20 are wheel speed sensors 91 which detect wheel speeds of the wheels W, a steering angle sensor 92 which detects a steering angle of a steering wheel ST as an example of a control member, a lateral acceleration sensor 93 which detects an acceleration which acts in a lateral direction of the vehicle CR, a yaw rate sensor 94 which detects a turning angular velocity (a yaw rate) of the vehicle CR and an acceleration sensor 95 which detects an acceleration in a front-to-rear or longitudinal direction of the vehicle CR. The results of detections of the individual sensors 91 to 95 are outputted to the controller 20.

The controller 20 includes, for example, a CPU, a RAM, a ROM and an input/output circuit and executes the control of the various types of constituent components by executing arithmetic operations based on inputs from the wheel speed sensors 91, the steering angle sensor 92, the lateral acceleration sensor 93, the yaw rate sensor 94 and the acceleration sensor 95 and a pressure sensor 8 described below (refer to FIG. 2), and programs and data which are stored in the ROM. Wheel cylinders H are hydraulic devices which convert a brake hydraulic pressure which is generated by a master cylinder MC and the vehicle brake hydraulic pressure control apparatus 100 into an operating force which operates wheel brakes FR, FL, RR, RL which are provided on the wheels W. The wheel cylinders H are connected individually to the hydraulic unit 10 of the vehicle brake hydraulic pressure control apparatus 100 via piping.

Figure 2:
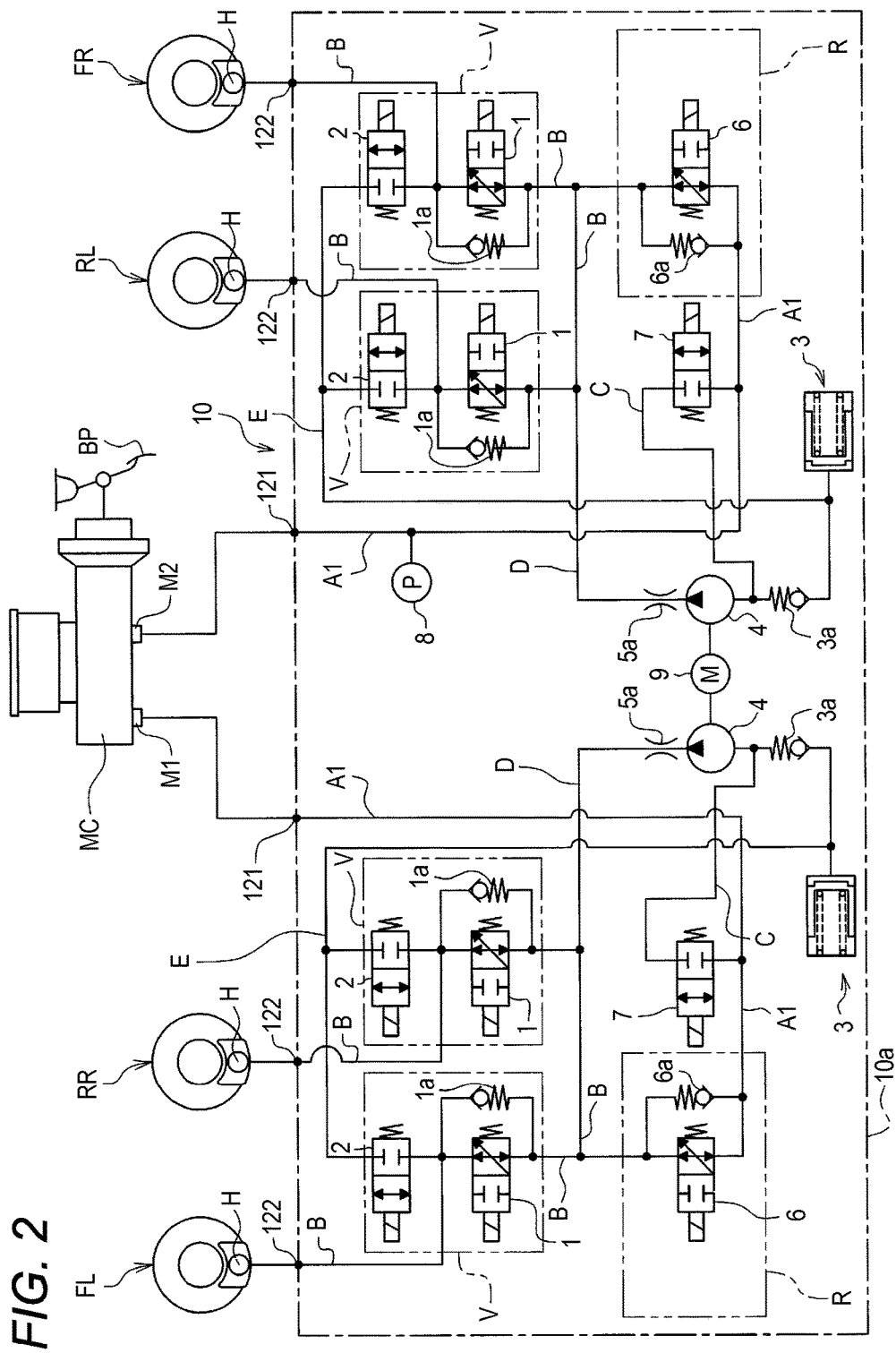
FIG. 2 is a brake hydraulic pressure circuit diagram of the vehicle brake hydraulic pressure control apparatus.

As shown in FIG. 2, the hydraulic unit 10 of the vehicle brake hydraulic pressure apparatus 100 is disposed between the master cylinder MC, which is a hydraulic pressure source for generating a brake hydraulic pressure in accordance with an depression amount of a brake pedal BP by the driver, and the wheel brakes FR, FL, RR, RL. The hydraulic unit 10 is made up of a pump body 10a which is a base body having fluid lines through which a brake fluid flows, pluralities of inlet valves 1 and outlet valves 2 which are disposed along the fluid lines, and the like. Two output ports M1, M2 of the master cylinder MC are connected individually to inlet ports 121 of the pump body 10a, and outlet ports 122 of the pump body 10a are connected individually to the wheel brakes FL, RR, RL, FR. Normally, fluid lines are established which communicate from the inlet ports 121 to the outlet ports 122 in the pump body 10a, whereby a depression amount of the brake pedal BP is transmitted to the wheel brakes FL, RR, RL, FR.

Here, a fluid line which originates from the output port M1 communicates with the front left wheel brake FL and the rear right wheel brake RR, while a fluid line which originates from the output port M2 communicates with the front right wheel brake FR and the rear left wheel brake RL. In the following description, the fluid line which originates from the output port M1 is referred to as a "first system" and the fluid line which originates from the output port M2 is referred to as a "second system."

In the hydraulic unit 10, two control valve units V are provided for the wheel brakes FL, RR in the first system. Similarly, two control valve units V are provided for the wheel brakes RL, FR in the second system. In the hydraulic unit 10, a reservoir 3, a pump 4, an orifice 5a, a regulator valve unit R and a suction valve 7 are provided for each of the first and second systems, and a common motor 9 is provided for driving the pump 4 in the first system and the pump 4 in the second system. This motor 9 is a motor whose revolution speed can be controlled, and in this embodiment, the revolution speed of the motor 9 is controlled through duty control. In this embodiment, the pressure sensor 8 is provided only in the second system.

In the following description, fluid lines which originate from the output ports M1, M2 of the master cylinder MC and reach the corresponding regulator valve units R are each referred to as an "output hydraulic line A1." Fluid lines which originate from the regulator valve unit R and reach the wheel brakes FL, RR in the first system and fluid lines which originate from the regulator valve unit R and reach the wheel brakes RL, FR in the second system are each referred to as a "wheel hydraulic line B." Fluid lines which originate from the output hydraulic lines A1 and reach the pumps 4 are each referred to as a "suction hydraulic line C," and fluid lines which originate from the pumps 4 and reach the wheel hydraulic line B are each referred to as a "discharge hydraulic line D." Fluid lines which originate from the wheel hydraulic lines B and reach the corresponding suction hydraulic lines C are each referred to as a "release line E."

The control valve units V are valves which control outbound and inbound flows of hydraulic pressure from the master cylinder MC or the pumps 4 to the wheel brakes FL, RR, RL, FR (specifically, to the wheel cylinders H) and can increase, hold or reduce the pressures of the corresponding wheel cylinders H. Because of this, the control valve units V each include an inlet valve 1, an outlet valve 2 and a check valve 1a.

The inlet valves 1 are normally open proportional solenoid valves which are individually provided between the wheel brakes FL, RR, RL, FR and the master cylinder MC, that is, on the wheel hydraulic lines B. Because of this, a differential voltage between an upstream and a downstream of the inlet valve 1 can be controlled in accordance with the value of a driving electric current which is caused to flow to the inlet valve 1.

The outlet valves 2 are normally closed solenoid valves which are interposed individually between the wheel brakes FL, RR, RL, FR and the reservoirs 3, that is, between the wheel hydraulic lines B and the release lines E. Although the outlet valves 2 are normally closed, by being opened by the controller 20 when the wheels W are about to be locked, the outlet valves 2 release brake hydraulic pressures applied to the wheel brakes FL, FR, RL, RR to the corresponding reservoirs 3.

The check valves 1a are connected to the corresponding inlet valves 1 in parallel. These check valves 1a are valves which permit only the flow of the brake fluid from the wheel brakes FL, FR, RL, RR towards the master cylinder MC. When the input from the brake pedal BP is removed, even with the inlet valves 1 closed, the check valves 1 permit the flow of the brake fluid from the wheel brakes FL, FR, RL, RR towards the master cylinder MC.

The reservoirs 3 are provided in the release lines E and each have a function to reserve temporarily the brake fluid which is released by the corresponding outlet valves 2 being opened. Check valves 3a which each permit only the flow of the brake fluid from the reservoir 3 towards the pump 4 are interposed individually between the reservoirs 3 and the pumps 4.

The pumps 4 are each interposed between the suction hydraulic line C which communicates with the output hydraulic line A1 and the discharge hydraulic line D which communicates with the wheel hydraulic lines B and have a function to suck the brake fluid reserved in the reservoir 3 to discharge it into the discharge hydraulic line D. Due to the pump 4 having such a function, since the brake fluid sucked by the reservoir 3 can be returned to the master cylinder MC, a brake hydraulic pressure can be generated, and a braking force can be generated in the wheel brakes FL, RR, RL, FR, regardless of whether or not the brake pedal BP is depressed.

The discharge amount of the brake fluid from the pumps 4 depends on the revolution speed (the duty ratio) of the motor 9. Namely, the discharge amount of the brake fluid from the motors 4 increases as the revolution speed (the duty ratio) of the motor 9 increases.

The orifices 5a attenuate the pulsation generated by the brake fluid which is discharged from the pumps 4 under pressure.

The regulator valve units R are normally permit the brake fluid to flow from the output hydraulic lines A1 to the wheel hydraulic lines B. Then, when the pressures at the wheel cylinders H are increased by brake hydraulic pressures generated by the pumps 4, the regulator valve units R function to control the pressures in the wheel hydraulic lines B and at the wheel cylinders H so as to become equal to or smaller than a predetermined value while cutting off the flow of the brake fluid which is normally permitted thereby. The regulator valve units R each include a selector valve 6 and a check valve 6a.

The selector valves 6 are normally open proportional solenoid valves which are individually interposed between the output hydraulic lines A1 which communicate with the master cylinder MC and the wheel hydraulic lines B which communicate with the corresponding wheel brakes FL, FR, RL, RR. Although not shown in detail, a valve body of the selector valve 6 is biased in a closed direction by an electromagnetic force which corresponds to an electric current imparted thereto. When the pressures in the wheel brake hydraulic lines B become higher by a predetermined value (which depends on the electric current imparted) or more than the pressures in the output hydraulic lines A1, the brake fluid is released from the wheel hydraulic lines B towards the output hydraulic lines A1, whereby the pressures in the wheel hydraulic lines B are controlled to a predetermined pressure. Namely, a valve closing force is changed arbitrarily in accordance with the value of a driving electric current (an indicated electric current value) which is inputted into the selector valves 6, whereby the differential pressure between the upstream and the downstream of the selector valve 6 are controlled, so that the pressures in the wheel hydraulic lines B can be controlled to the set value or smaller.

The check valves 6a are connected individually to the selector valves 6 in parallel. The check valves 6a are each a one-way valve which permits the brake fluid to flow from the output hydraulic line A1 to the wheel hydraulic lines B.

The suction valves 7 are normally closed solenoid valves which are individually provided in the suction hydraulic lines C and switch the state of the corresponding suction hydraulic lines C from an open state to a cut-off state or vice versa. For example, when the brake hydraulic pressures in the wheel brakes FL, FR, RL, RR are increased by the pumps 4, the suction valves 7 are controlled to be opened by the controller 20.

The pressure sensor 8 detects a brake hydraulic pressure in the output hydraulic line A1, and the result of the detection made by the pressure sensor 8 is inputted into the controller 20.

Next, the controller 20 will be described in detail.

Figure 3:
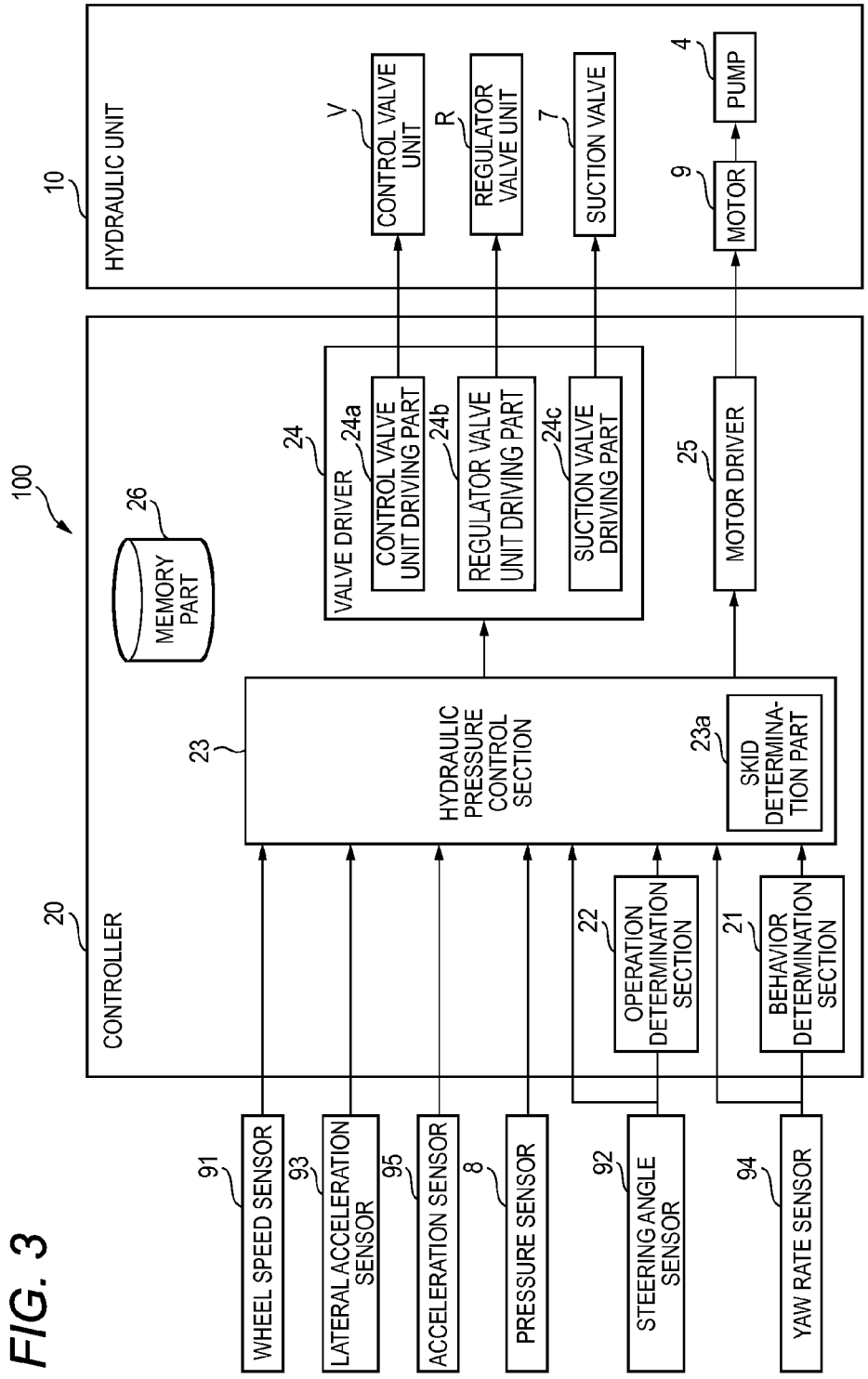
FIG. 3 is a block diagram of a controller.

As shown in FIG. 3, the controller 20 controls the opening and closing operations of the control valve units V, the regulator valve units R (the selector valves 6) and the suction valves 7 in the hydraulic unit 10 and the operation of the motor 9 based on the signals which are inputted thereinto from the individual sensors 91 to 95 and 8 so as to control the operations of the individual wheel brakes FL, RR, RL, FR. The controller 20 includes a behavior determination section 21, an operation determination section 22, a hydraulic pressure control section 23, a valve driver 24, a motor driver 25 and a storage 26.

The behavior determination section 21 has a function to determine whether or not a yaw rate Y (an absolute value) which is outputted from the yaw rate sensor 94 is equal to or larger than a first threshold Yth. Then, when determining that the yaw rate Y is equal to or larger than the first threshold Yth, the behavior determination section 21 outputs a yaw rate generation signal which signals the determination to the hydraulic pressure control section 23.

The operation determination section 22 has a function to determine whether or not the steering wheel ST has been operated by determining whether or not a steering angle $\theta$ (an absolute value) which is outputted from the steering angle sensor 92 is equal to or larger than a second threshold $\theta$th. Then, when determining that the steering wheel ST has been operated, the operation determination section 22 outputs an operation signal which signals the determination to the hydraulic pressure control section 23.

The first threshold Yth and the second threshold $\theta$ may be set as required based on experiments or simulations.

The hydraulic pressure control section 23 has a function to instruct the valve driver 24 and the motor driver 25 to operate the various valves and to drive the motor 9, respectively, so as to control the brake hydraulic pressures in a plurality of types of control modes such as, for example, a known skid suppression control mode, a traction control mode and a vehicle hold control based on the signals which are inputted thereinto from the individual sensors 91 to 95 and 8. The "vehicle hold control" means a mode of controlling a brake hydraulic pressure at the vehicle halting state etc. The "vehicle hold control" includes holding the brake hydraulic pressure to a brake hydraulic pressure at a value corresponding to a depression amount of the brake pedal BP and increasing the brake hydraulic pressure (for example, by the pump 4) to be higher than a value corresponding to the depression amount of the brake pedal BP, when the vehicle comes to a halt. The various control modes are stored in the storage 26.

The hydraulic pressure control section 23 has a skid determination part 23a which determines whether or not the vehicle CR is in a skid state (a side slip state) based on the signals outputted from the behavior determination section 21 and the operation determination section 22. Specifically, in a state in which the vehicle hold control is not executed, when receiving a yaw rate generation signal from the behavior determination section 21, the skid determination part 23a determines that the vehicle CR is in the skid state and sets a skid determination flag F to 1. When receiving no yaw rate signal, the skid determination part 23a sets the skid determination flag F to 0. In a state in which the vehicle hold control is executed, when receiving not only a yaw rate signal from the behavior determination section 21 but also an operation signal from the operation determination section 22, the skid determination part 23a determines that the vehicle CR is in the skid state and sets the skid determination flag F to 1. When the individual conditions are both not met, the skid determination part 23a sets the skid F to 0.

To start the vehicle hold control, the hydraulic pressure control section 23 determines not only whether or not known vehicle hold control starting condition is met but also whether or not the above-described skid determination flag F is set to 1 (whether or not a side slip occurs). That is, the vehicle hold control is started when the vehicle hold control starting condition is met and the skid determination flag F is not 1 (no side slip occurs). In other words, when the behavior determination section 21 determines that the yaw rate Y is equal to or larger than the first threshold Yth (when the skid determination flag F is 0) before the start of the vehicle hold control, the hydraulic pressure control section 23 prohibits the start of the vehicle hold control.

In this way, by watching the side slip (the yaw rate Y) condition as well as the known vehicle hold control starting condition, even if the vehicle hold control starting condition is met, when the side slip is occurring, the start of the vehicle hold control is prohibited. Thus, for example, compared with the configuration in which the vehicle hold control is anyway started even though the side slip occurs immediately before the vehicle CR comes to a halt, an unnecessary execution of the vehicle hold control while the vehicle CR is slipping sideways can be avoided.

As the vehicle hold control starting condition, any condition may be adopted as long as they indicate that the vehicle CR is going to be stopped. For example, a condition in which a vehicle speed calculated based on the signals from the wheel speed sensors 91 is equal to or slower than a predetermined value V1 (refer to FIG. 6A) may be adopted.

When the skid determination flag F is 1 during the vehicle hold control, the hydraulic pressure control section 23 cancels the vehicle hold control regardless of whether or not a known cancellation condition is established. Namely, the hydraulic pressure control section 23 cancels the vehicle hold control when the behavior determination section 21 determines that the yaw rate Y is equal to or larger than the first threshold Yth and the operation determination section 22 determines that the steering wheel ST has been operated.

According to this configuration, even when the yaw rate Y becomes equal to or larger than the first threshold Yth during the vehicle hold control, the vehicle hold control is not cancelled unless the steering wheel ST is operated. Therefore, even though a yaw rate which is equal to or larger than the first threshold Yth is generated in the vehicle CR when it stays at a halt, for example, on a turntable equipped to a parking tower, a reduction of brake hydraulic pressure which is not intended by the driver can be suppressed. On the other hand, when the vehicle CR which stays at a halt on a slope with a low-μ road surface such as an iced road or the like starts to slide down backwards while turning during the vehicle hold control, the yaw rate Y equal to or larger than the first threshold Yth will be produced in the vehicle CR, and the driver will operate the steering wheel ST. Accordingly, the vehicle hold control is canceled and the brake hydraulic pressure held is reduced, thereby allowing the driver to regain control of the vehicle CR.

As the known cancellation condition, for example, a condition can be raised that a starting operation is performed with the vehicle CR shifted in a "D" or "R" position.

The valve driver 24 is a section which controls the control valve units V, the regulator valve units R and the suction valves 7 based on an instruction from the hydraulic pressure control section 23. To make this happen, the valve driver 24 has a control valve unit driving part 24a, a regulator valve unit driving part 24b and a suction valve driving part 24c.

The control valve unit driving part 24a controls the inlet valves 1 and the outlet valves 2 based on an instruction from the hydraulic pressure control section 23 to increase, hold or reduce the brake hydraulic pressure. Specifically, to increase the pressures at the wheel cylinders H, the control valve unit driving part 24a causes no electric current to flow to both the inlet valves 1 and the outlet valves 2. to reduce the pressures at the wheel cylinders H, the control valve unit driving part 24a sends signals both to the inlet valves 1 and the outlet valves 2 so that the inlet valves 1 are closed and the outlet valves 2 are opened, whereby the brake fluid in the wheel cylinders H is caused to flow out of the outlet valves 2. To hold the pressures at the wheel cylinders H, the control valve unit driving part 24a sends signals to the inlet valves 1 while causing no electric current to flow to the outlet valves 2, whereby both the inlet valves 1 and the outlet valves 2 are closed.

The regulator valve unit driving part 24b normally causes no electric current to flow to the regulator valve units R. Then, when given an instruction to drive the regulator valve units R from the hydraulic pressure control section 23, following the instruction, the regulator valve unit driving part 24b causes an electric current to flow to the regulator valve units R through duty control. When the electric current is caused to flow to the regulator valve units R, a differential pressure corresponding to the electric current is formed between a side facing the master cylinder MC and a side facing the control valve unit V (the wheel cylinders H) of each of the regulator valve units R. As a result of this, the hydraulic pressure in the discharge hydraulic line D between the regulator valve unit R and the control valve units V is controlled.

The suction valve driving part 24c normally causes no electric current to the suction valves 7. And, upon receipt of an instruction from the hydraulic pressure control section 23, the suction valve driving part 24c outputs signals to the suction valves 7 based on the instruction. This opens the suction valves 7 whereby the brake fluid is sucked into the pumps 4 from the master cylinder MC.

The motor driver 25 determines the revolution speed of the motor 9 based on an instruction from the hydraulic pressure control section 23 and drives the motor 9 at the revolution speed so determined. Namely, the motor driver 25 drives the motor 9 through revolution speed control, and in this embodiment, the revolution speed is controlled through duty control.

Next, the operation of the controller 20 will be described by reference to FIGS. 4 and 5.

Figure 4:
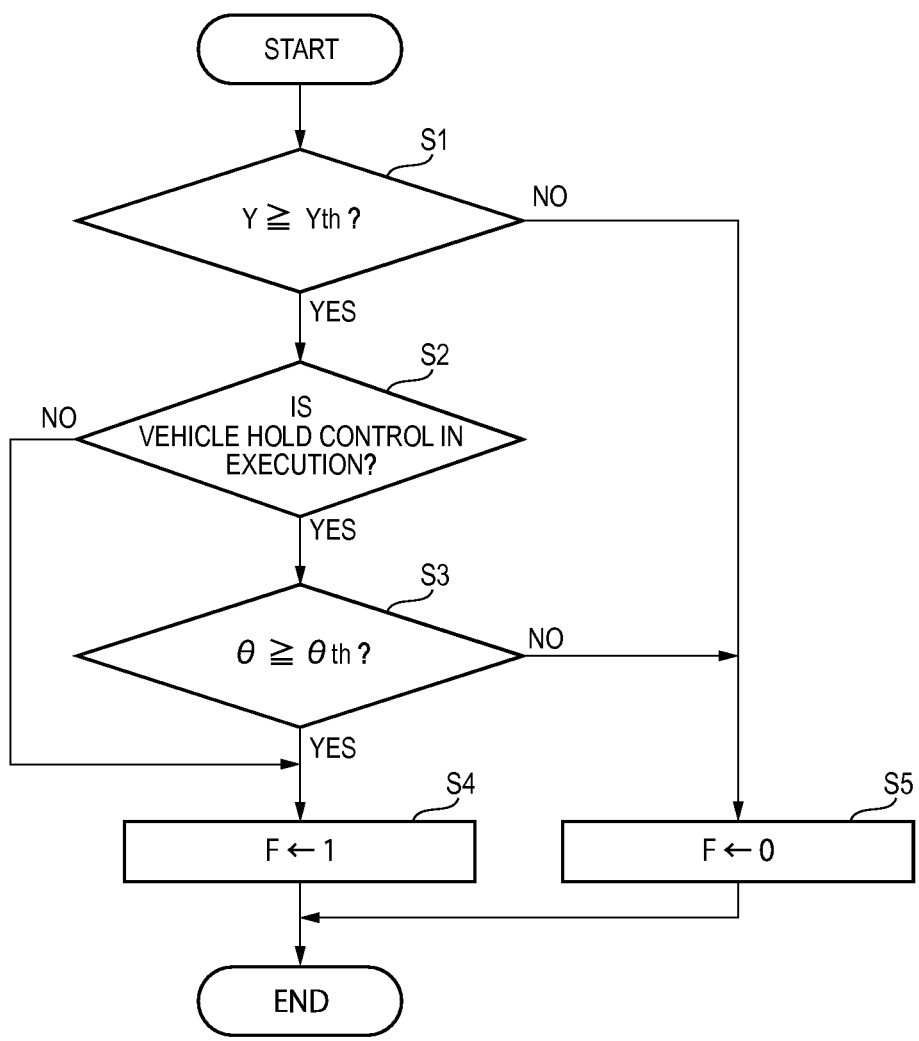
FIG. 4 is a flowchart showing a skit determination flag setting process.
Figure 5:
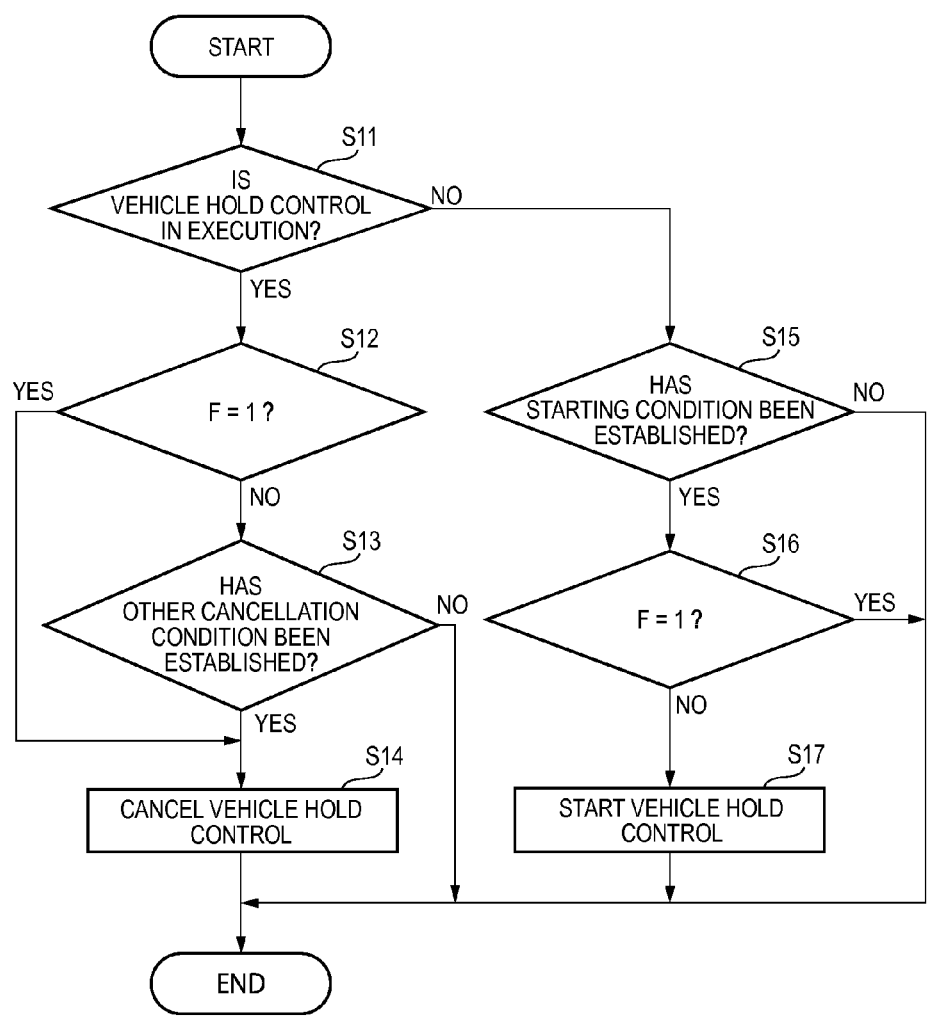
FIG. 5 is a flowchart showing a process of starting or canceling a vehicle hold control.

The controller 20 executes a skid determination flag setting process shown in FIG. 4 and a process of starting or canceling the vehicle hold control shown in FIG. 5 in a repeated fashion.

In the process shown in FIG. 4, firstly, the controller 20 determines whether or not the yaw rate Y applied to the vehicle CR is equal to or larger than the first threshold Yth (S1). If it determines in step S1 that the yaw rate Y is equal to or larger than the first threshold Yth (Yes), the controller 20 determines whether or not the vehicle hold control is in execution (S2).

If it determines in step S2 that the vehicle hold control is in execution (Yes), the controller 20 determines whether or not the steering angle θ of the steering wheel ST is equal to or larger than the second threshold θth (S3). If it determines in step S2 that the vehicle hold control is not in execution (No) or determines in step S3 that the steering angle θ is equal to or larger than the second threshold θth (Yes), the controller 20 sets the skid determination flag F to 1 (S4) and ends the control.

If it determines in step S1 that the yaw rate Y is smaller than the first threshold Yth (No) or determines in step S3 that the steering angle θ is smaller than the second threshold θth, the controller 20 sets the skid determination flag F to 0 (S5) and ends the control.

The controller 20 executes the process shown in FIG. 5 after the end of the process shown in FIG. 4. In the process shown in FIG. 5, firstly, the controller 20 determines whether or not the vehicle hold control is in execution (S11). If it determines in step S11 that the vehicle hold control is in execution (Yes), the controller 20 determines whether or not the skid determination flag F is 1 (S12).

If it determines in step S12 that the skid determination flag F is not 1 (No), the controller 20 determines whether or not the other cancellation condition is established (S13). If it determines in Step S12 that the slid determination flag F is 1 (Yes) or determines in step S13 that the other cancellation condition is established (Yes), the controller 20 cancels the vehicle hold control (S14) and ends the control.

If it determines in step S13 that the other cancellation condition is not established (No), the controller 20 ends the control without canceling the vehicle hold control. Namely, in this case, the vehicle hold control is kept executed.

If it determines in step S11 that the vehicle hold control is not in execution (No), the controller 20 determines whether or not the vehicle hold control starting condition is established (S15). If it determines in step S15 that the starting condition is established (Yes), the controller 20 determines whether or not the skid determination flag F is 1 (S16).

If it determines in step S16 that the skid determination flag F is not 1 (No), the controller 20 starts the vehicle hold control (S17) and ends the control. If it determines in step S15 that the starting condition is not established (No) or determines in step S16 that the skid determination flag F is 1 (Yes), the controller 20 ends the control without starting the vehicle hold control.

Next, a control to be executed when the yaw rate is applied to the vehicle CR during the vehicle hold control and a control to be executed when the yaw rate is applied to the vehicle CR immediately before the vehicle hold control is started will be described by reference to FIGS. 6A to 6G and 7A to 7G, respectively. In FIGS. 6A to 6G and 7A to 7G, the yaw rate and the steering angle are illustrated as absolute values. Firstly, referring to FIGS. 6A to 6G, the control to be executed when the yaw rate is applied to the vehicle CR during the vehicle hold control will be described.

Figure 6A:
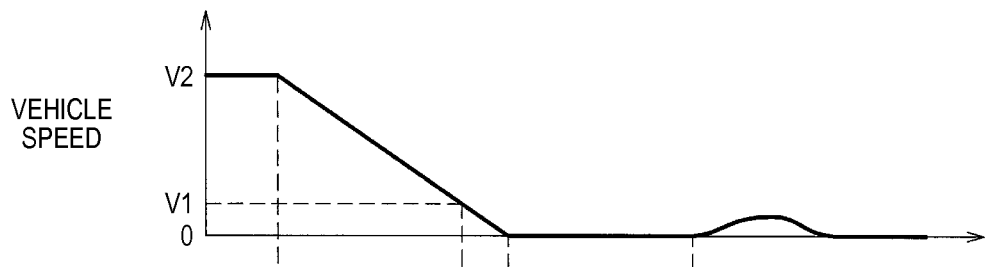
FIGS. 6A to 6G are time charts showing changes in parameters when a yaw rate is applied to the vehicle during the vehicle hold control.
Figure 6B:
Figure 6C:
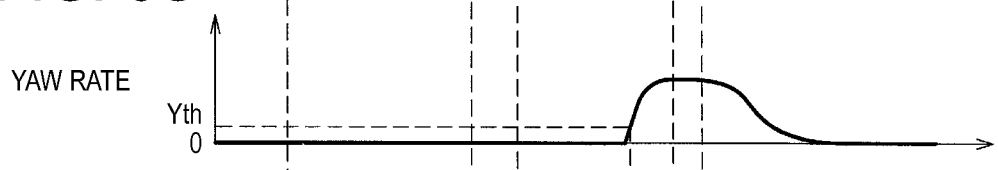
Figure 6D:
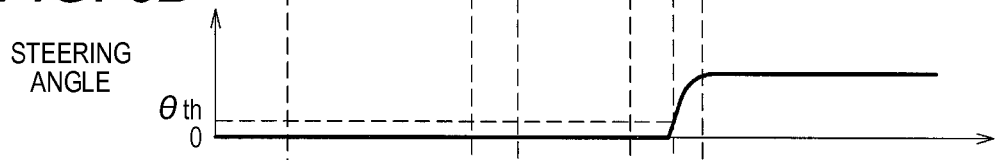
Figure 6E:
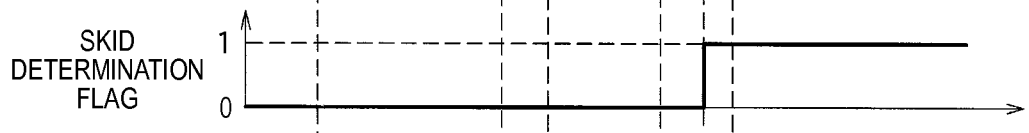
Figure 6F:
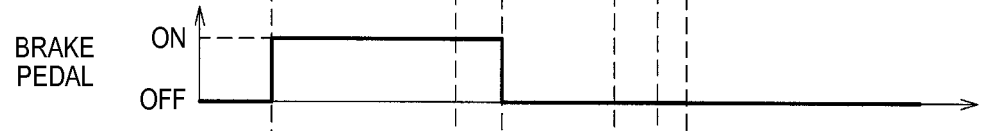

As shown at FIGS. 6A, 6B and 6F, when the driver depresses the brake pedal BP (time t1) while the vehicle CR is running at a vehicle speed V2, the brake hydraulic pressures at the wheel cylinders H are reduced gradually, and the vehicle speed is also reduced gradually. When the vehicle speed is reduced to a predetermined value V1 (time t2), the vehicle hold control is executed, for example, at a brake hydraulic pressure P1 then (refer to FIG. 6G), and the vehicle CR comes to a halt (time t3). In the example shown in FIGS. 6A to 6Q the vehicle CR comes to a halt on an uphill.

Figure 6G:
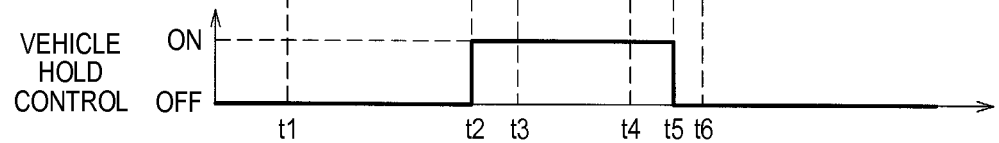

After the vehicle CR has come to a halt, as shown in FIG. 6F, even though the driver releases the brake pedal 13P (time t3) the brake hydraulic pressure is held by the vehicle hold control (refer to FIG. 6B). When the road surface of the uphill on which the vehicle CR is at a halt is a low-μ road surface as of an iced road, as shown at FIGS. 6C and 6G, a yaw rate Y is generated during the vehicle hold control (time t2 to time t5), and there may be a situation in which the yaw rate Y exceeds the first threshold Yth (time t4). Namely, there may be a situation in which the vehicle CR slides down on the uphill while turning (slipping sideways).

As this occurs, the driver operates the steering wheel ST in order to regain control of the vehicle CR. When the steering angle θ exceeds the second threshold θth (time t5) as a result of the steering wheel ST being so operated as shown in FIG. 6D, the controller 20 sets the skid determination flag F to 1 and cancels the vehicle hold control as shown at FIGS. 6E and 6G, respectively.

When the vehicle hold control is canceled, as shown in FIG. 6B, the brake hydraulic pressure held by the vehicle hold control is reduced continuously, and therefore, as shown in FIG. 6A, the locked state (the slipping state) of the wheels W is eliminated (time t6), and the gripping force of the wheels W is restored, thereby allowing the driver to regain control of the vehicle CR.

Next, referring to FIGS. 7A to 7G, the control to be executed when the yaw rate is applied to the vehicle CR immediately before the vehicle hold control is started will be described.

Figure 7A:
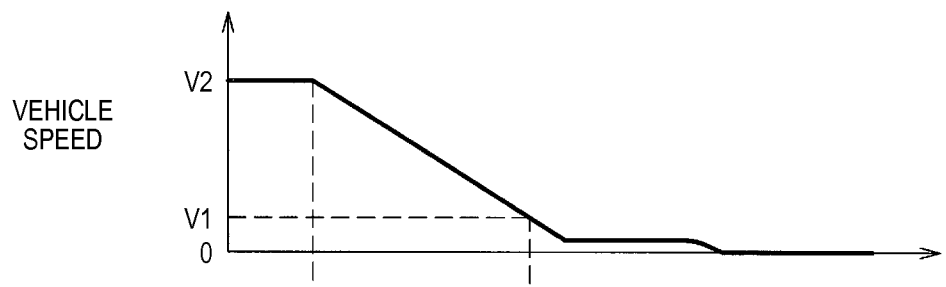
FIGS. 7A to 7G are time charts showing changes in parameter when a yaw rate is applied to the vehicle immediately before the vehicle hold control is initiated.
Figure 7B:
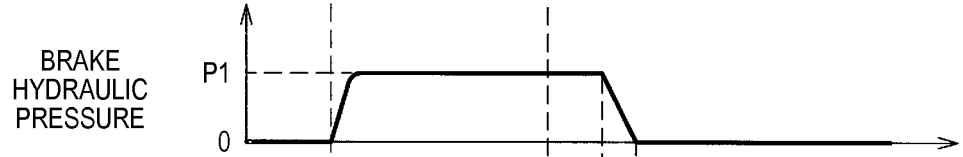
Figure 7C:
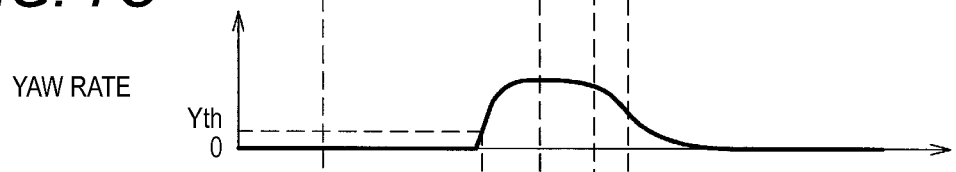
Figure 7D:
Figure 7E:
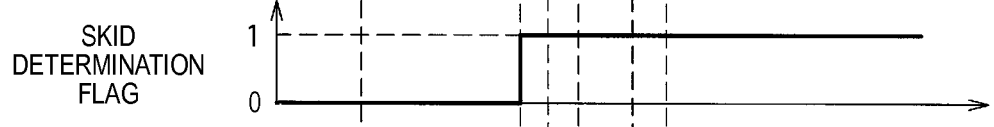
Figure 7F:
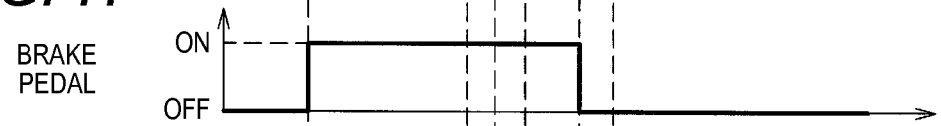

As shown at FIGS. 7A, 7B and 7F, when the driver depresses the brake pedal BP (time t11) while the vehicle CR is running at the vehicle speed V2, the brake hydraulic pressure is increased, while the vehicle speed is reduced. As this occurs, there may be a situation in which a yaw rate Y is generated in the vehicle CR before the vehicle speed is reduced to the predetermined value V1 (before time t14), that is, before the vehicle hold control is executed.

Figure 7G:
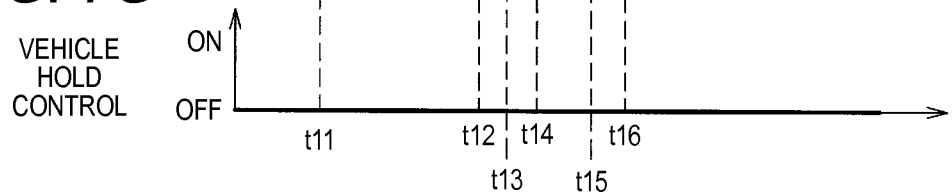

When the yaw rate Y so generated exceeds the first threshold Yth (time t12), as shown in FIG. 7E, the skid determination flag F becomes 1. This prevents the vehicle hold control from being started even though the vehicle speed becomes equal to or slower than the predetermined value V1 at time t14 as shown at FIGS. 7A and 7G, and therefore, an unnecessary execution of the vehicle hold control while the vehicle CR is sliding sideways can be avoided.

When the vehicle CR turns (slides sideways) while slipping before the start of the vehicle hold control, as shown at FIGS. 7B, 7C, 7D and 7F, the driver operates the steering wheel ST (time t13) in order to regain control of the vehicle CR. When the turning of the vehicle CR cannot be stopped only by operating the steering wheel ST in such a way (time t13 to time t15), the driver releases the brake pedal BP (time t15). By doing so, the brake hydraulic pressure is reduced, and the locked state (the slipping state) of the wheels W is eliminated. Thus, the gripping force of the wheels W can be restored, thereby allowing the driver to regain control of the vehicle CR.

Thus, according to the embodiment, in addition to the advantages described above, the following advantages can be obtained.

Whether or not the steering wheel ST is operated is determined by determining whether or not the steering angle θ of the steering wheel ST is equal to or larger than the second threshold θth, and therefore, the brake hydraulic pressure is not reduced by a slight steering angle (a steering angle which is smaller than the second threshold θth). Because of this, an erroneous reduction of brake hydraulic pressure which is triggered by a slight movement of the steering wheel which would be caused by an erroneous touch with the steering wheel ST by the driver can be suppressed.

The determination is made based on the operation amount (the steering angle θ) of the steering wheel ST in consideration of the fact that the driver will operate the steering wheel ST in order to regain control of the vehicle CR. Therefore, a reduction of brake hydraulic pressure can be preferably performed.

Second Embodiment

Next, referring to the drawings as required, a second embodiment of the invention will be described in detail. Since this embodiment describes a modification to the skid determination flag setting process (the process shown in FIG. 4) according the first embodiment, like reference numerals will be given to configurations and operations which are like to those of the first embodiment for omission of the description thereof.

Figure 8:
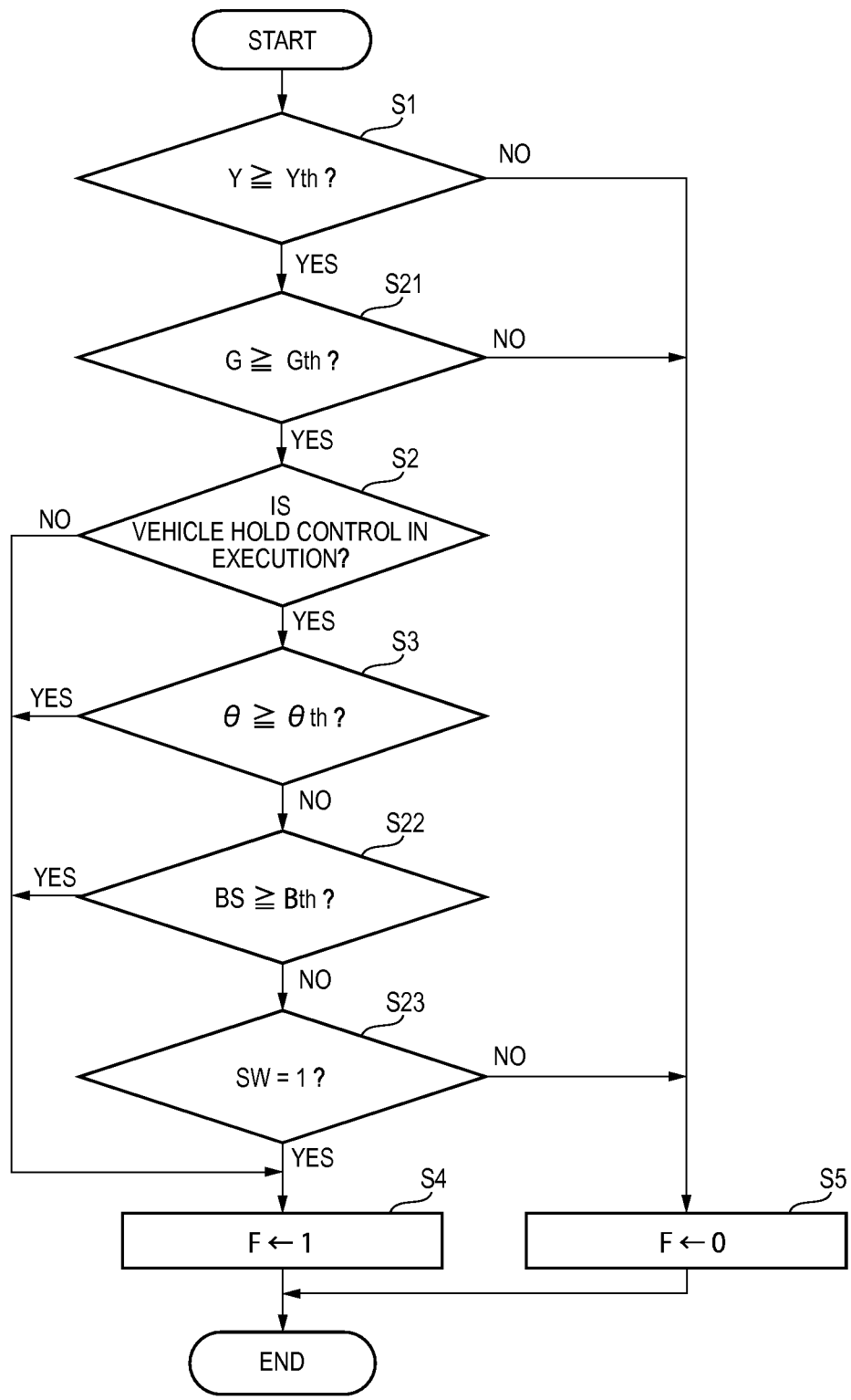
FIG. 8 is a flowchart showing a skid determination flag setting process according to a second embodiment.

As shown in FIG. 8, in a skid determination flag setting process according to the second embodiment which is based on the skid determination flag setting process shown in FIG. 4, a front-to-rear or longitudinal acceleration G detected at the acceleration sensor 95 is added as a vehicle behavior condition. Additionally, a depression amount BS of the brake pedal BP and an on/off state (non-depressed state/depressed state) of a hold control selection switch which changes the state of execution of the vehicle hold control between permission and cancellation (ON and OFF) are added as control member operating conditions.

The switching of the state of execution of the vehicle hold control between permission and cancellation is made in consideration of not only the on/off state of the hold control selection switch but also other conditions. Specifically, for example, in order to prevent the vehicle which stays at a halt on an uphill with the vehicle hold control in execution from sliding down backwards as a result of the driver or a passenger other than the driver erroneously touching the hold control selection switch to switch it off, the vehicle hold control can be cancelled on condition that the brake pedal BP is being depressed and the vehicle hold control is off (depressed).

Hereinafter, the process shown in FIG. 8 will be described.

In the process shown in FIG. 8, if it determines in step S1 that the yaw rate Y is equal to or larger than the first threshold Yth (Yes), the controller 20 determines then whether or not the longitudinal acceleration G is equal to or larger than a third threshold Gth (S21). If it determines in step S21 that the longitudinal acceleration G is equal to or larger than the third threshold Gth (Yes), the controller 20 proceeds then to an operation in step S2, whereas when it determines that the longitudinal acceleration G is smaller than the third threshold Gth (No), the controller 20 proceeds then to an operation in step S5 and sets the skid determination flag F to 0.

If it determines in step S2 that the vehicle hold control is in execution (Yes) and determines in step S3 that the steering angle θ is smaller than the second threshold θth (No), the controller 20 determines then whether or not the depression amount BS of the brake pedal BP is equal to or larger than a fourth threshold Bth (S22). If it determines in step S22 that the depressed amount BS is equal to or larger than the fourth threshold Bth (Yes), the controller 20 proceeds then to an operation in step S4 and sets the skid determination flag F to 1.

If it determines in step S22 that the depressed amount BS is smaller than the fourth threshold Bth (No), the controller 20 determines whether or not the hold control selection switch is off (depressed), specifically, the controller 20 determines whether or not a switch flag SW is 1 (S23). The switch flag SW becomes 1 when the hold control selection switch is off (in the depressed state), whereas the switch flag SW becomes 0 when the hold control selection switch is on (in the non-depressed state).

If it determines in step S23 that the switch flag SW is 1 (Yes), the controller 20 set the skid determination flag F to 1 (S4), whereas if it determines that the switch flag SW is 0 (No), the controller 20 sets the skid determination flag F to 0 (S5).

By adding the longitudinal acceleration G as the vehicle behavior condition, the skid determination can be performed more accurately. Additionally, by adding the depressed amount BS of the brake pedal BP and the ON/OFF state of the hold control selection switch as the control member operating conditions, when the vehicle CR which stays at a halt on the uphill slides down backwards while turning, the skid determination flag F can be set to 1 even in the event that the driver only depresses the brake pedal BP or only switches off the hold control selection switch without operating the steering wheel ST. Thus, the vehicle hold control can be appropriately cancelled in response to the driver's sudden operations of the control members other than the steering wheel ST, thereby allowing the driver to regain control of the vehicle CR.

The invention is not limited to the above-described embodiments and hence can be variously embodied, for example, as described below.

In the embodiments, while the yaw rate is described as the example of the behaving amount in the lateral direction of the vehicle, the invention is not limited thereto. The yaw rate may be, for example, the lateral acceleration which is detected at the lateral acceleration sensor. However, it may be more preferable to adopt the yaw rate as the behaving amount as in the embodiments in order to determine the side slip state (the skid state) of the vehicle.

In the embodiments, while the pressure reduction control (the pressure reduction control when the vehicle hold control is cancelled) is executed by controlling the regulator valve units R, the invention is not limited thereto. For example, when the brake hydraulic pressure is increased, held or reduced by an electric booster which moves a piston in a master cylinder by driving a motor, the application and cancellation of the vehicle hold control may be executed by controlling the electric booster.

The invention claimed is:

1. A vehicle brake hydraulic pressure control apparatus configured to perform a vehicle hold control which controls a brake hydraulic pressure when a vehicle comes to a halt, comprising:
   a behavior determination section configured to determine whether or not a behaving amount in a lateral direction of the vehicle is equal to or larger than a first threshold; and
   an operation determination section configured to determine whether or not a control member provided to control the vehicle is operated,
   wherein the vehicle hold control is canceled at least when the behavior determination section determines that the behaving amount is equal to or larger than the first threshold and the operation determination section determines that the control member is operated,
   wherein the control member includes a steering, a brake pedal and a hold control selection switch, the hold control selection switch being operable to change a state of execution of the vehicle hold control between permission and cancellation,
   wherein the vehicle hold control is configured to be canceled, in a first condition, the first condition includes,
   that the brake pedal is operated, and
   that the hold control selection switch is operated, and
   wherein the vehicle hold control is configured to be canceled, in a second condition, the second condition includes, in a state where the behavior determination section determines that the behaving amount is equal to or larger than the first threshold,
   that the steering is operated, or
   that the brake pedal is operated, or
   that the hold control selection switch is operated.

2. The vehicle brake hydraulic pressure control apparatus of claim 1,
   wherein the operation determination section determines whether or not the control member is operated by determining whether or not an operation amount of the control member is equal to or larger than a second threshold.

3. The vehicle brake hydraulic pressure control apparatus of claim 2,
   wherein the operation amount of the control member is a steering angle of a steering wheel which is outputted from a steering angle sensor.

4. The vehicle brake hydraulic pressure control apparatus of claim 1,
   wherein the behaving amount is a yaw rate which is outputted from a yaw rate sensor.

5. The vehicle brake hydraulic pressure control apparatus of claim 1,
   wherein, when the behavior determination section determines that the behaving amount is equal to or larger than the first threshold before the vehicle hold control is started, the vehicle hold control is prohibited from being performed.

6. The vehicle brake hydraulic pressure control apparatus of claim 1, wherein the control member is a steering wheel.

7. The vehicle brake hydraulic pressure control apparatus of claim 6, further comprising:
   wheel speed sensors which detect wheel speeds of the wheels;
   a steering angle sensor which detects a steering angle of a steering wheel;
   a lateral acceleration sensor which detects an acceleration which acts in a lateral direction of the vehicle;
   a yaw rate sensor which detects a turning angular velocity of the vehicle; and
   an acceleration sensor which detects an acceleration in a front-to-rear or longitudinal direction of the vehicle.

8. The vehicle brake hydraulic pressure control apparatus of claim 7, wherein the behavior determination section determine whether or not a yaw rate outputted from the yaw rate sensor is equal to or larger than the first threshold and when determining the yaw rate is equal to or larger than the first threshold, the behavior determination section outputs a yaw rate generation signal which signals the determination to a hydraulic pressure control section.

9. The vehicle brake hydraulic pressure control apparatus of claim 8, wherein the operation determination section determines whether or not the steering wheel has been operated by determining whether or not a steering angle θ which is outputted from the steering angle sensor is equal to or larger than a second threshold.

10. The vehicle brake hydraulic pressure control apparatus of claim 9, wherein when determining that the steering wheel has been operated, the operation determination section outputs an operation signal which signals the determination to the hydraulic pressure control section.

11. The vehicle brake hydraulic pressure control apparatus of claim 10, wherein the hydraulic pressure control section instruct a valve driver and a motor driver to operate various valves and to drive a motor, respectively, so as to control the brake hydraulic pressure in a plurality of types of control modes including a skid suppression control mode, a traction control mode and a vehicle hold control based on the signals which are inputted thereinto from at least the wheel speed sensors, the steering angle sensor, the lateral acceleration sensor, the yaw rate sensor, and the acceleration sensor.

12. The vehicle brake hydraulic pressure control apparatus of claim 11, wherein the vehicle hold control includes holding the brake hydraulic pressure to a brake hydraulic pressure at a value corresponding to a depression amount of a brake pedal and increasing the brake hydraulic pressure to be higher than a value corresponding to the depression amount of the brake pedal BP, when the vehicle comes to a halt.

13. The vehicle brake hydraulic pressure control apparatus of claim 11, wherein to start the vehicle hold control, the hydraulic pressure control section determines whether or not a vehicle hold control starting condition is met and whether or not a side slip occurs.

14. The vehicle brake hydraulic pressure control apparatus of claim 13, wherein when the behavior determination section determines that the yaw rate is equal to or larger than the first threshold before start of the vehicle hold control, the hydraulic pressure control section prohibits the start of the vehicle hold control.

15. The vehicle brake hydraulic pressure control apparatus of claim 14, wherein the hydraulic pressure control section cancels the vehicle hold control when the behavior determination section determines that the yaw rate Y is equal to or larger than the first threshold and the operation determination section determines that the steering wheel has been operated.

16. The vehicle brake hydraulic pressure control apparatus of claim 1, wherein the vehicle hold control includes holding the brake hydraulic pressure to a brake hydraulic pressure at a value corresponding to a depression amount of a brake pedal and increasing the brake hydraulic pressure to be higher than a value corresponding to the depression amount of the brake pedal BP, when the vehicle comes to a halt.

17. The vehicle brake hydraulic pressure control apparatus of claim 1, wherein to start the vehicle hold control, a hydraulic pressure control section determines whether or not a vehicle hold control starting condition is met and whether or not a side slip occurs.

* * * * *